United States Patent [19]

Sasaki et al.

[11] Patent Number: 4,876,686
[45] Date of Patent: Oct. 24, 1989

[54] FAULT DETECTION SIGNAL TRANSMISSION SYSTEM

[75] Inventors: Katsuhiro Sasaki; Seiji Fukuda, both of Tokyo, Japan

[73] Assignee: NEC Corporation, Tokyo, Japan

[21] Appl. No.: 110,316

[22] Filed: Oct. 20, 1987

[30] Foreign Application Priority Data

Oct. 20, 1986 [JP] Japan ............................... 61-248983

[51] Int. Cl.[4] ............................................. G06F 11/10
[52] U.S. Cl. ........................................ 371/49.1; 371/3
[58] Field of Search ................... 371/3, 49, 50, 51, 22, 371/7, 8, 9

[56] References Cited

U.S. PATENT DOCUMENTS

| | | | |
|---|---|---|---|
| 4,107,649 | 8/1978 | Kurihara | 371/3 |
| 4,429,391 | 1/1984 | Lee | 371/49 |
| 4,670,876 | 6/1987 | Kirk | 371/3 |
| 4,682,334 | 7/1987 | Le Mouel | 371/49 |
| 4,727,548 | 2/1988 | Dickey | 371/49 |
| 4,744,092 | 5/1988 | Betts | 371/49 |

*Primary Examiner*—Michael R. Fleming
*Attorney, Agent, or Firm*—Sughrue, Mion, Zinn, Macpeak & Seas

[57] ABSTRACT

A digital signal transmission system includes a transmit terminal which as an input interface circuit, a synchronous conversion circuit, a synchronous conversion circuit, a parity check circuit, a multiplex circuit for multiplexing a synchronized input signal with at least a parity check signal, a transmitter and antenna. A fault detector circuit of the transmit terminal detects faults in the input interface stage. The outputs of the fault detector circuit and the parity check circuit are input to a parity check signal output circuit which operates to invert the logical state of the output of the parity check circuit when a fault is detected. A digital signal reception system includes a receive terminal, which has a demultiplex circuit, a frame synchronization circuit, a parity check circuit, a synchronous conversion circuit, an output inface circuit, a receiver and antenna. The transmitted parity check signal is recovered from the demultiplex circuit. The receive terminal parity check circuit determines the parity signal from the received signal. A receive terminal parity check signal comparison circuit compares the determined parity signal with the recovered parity check signal. A fault in the transmit terminal input stage will be recognized at the receive terminal as a non-coincidence output from the comparison circuit.

13 Claims, 1 Drawing Sheet

FAULT DETECTION SIGNAL TRANSMISSION SYSTEM

BACKGROUND OF THE INVENTION

The present invention relates to a radio digital signal transmission system and, more particularly, to a fault detection signal transmission system in which a transmit terminal sends to a receive terminal a fault detection signal which is representative of a fault in an input stage circuit of the transmit terminal.

A conventional fault detection signal transmission system of this kind comprises a transmit terminal and a receive terminal. In a digital signal processing circuit of the transmit terminal, a signal to be transmitted is digitally processed and then multiplexed with a parity check signal and other various kinds of signals including a fault detection signal. The fault detection signal is associated with an input stage circuit of the transmit terminal, i.e., a transmit interface circuit and any circuitry preceding the circuit as will be described hereinafter. The processed and multiplexed signal is modulated and frequency converted by a transmitter and sent o the receive terminal.

In the receive terminal, a received signal including the parity check signal and the fault detection signal is frequency converted and demodulated by a receiver, parity checked and demultiplexed by a digital signal processing circuit. Also, an alarm signal is provided based on the demultiplexed fault detection signal.

In such a transmission system, some time slots must be assigned to multiplex the fault detection signal as well as the parity check signal. This complicates the transmit terminal and lowers the transmission efficiency as will be more obvious hereinafter.

SUMMARY OF THE INVENTION

It is, therefore, an object of the present invention to provide a fault detection signal transmission system capable of transmitting an apparatus fault detection signal without resorting to a particular time slot otherwise defined in a transmission frame.

In accordance with the present invention, in a fault detection signal transmission system having a transmit terminal and a receive terminal, the transmit terminal comprises a fault detector circuit for generating a fault detection signal by detecting an apparatus fault based on at least an input state of a transmit interface circuit, a multiplex conversion circuit for producing a multiplex signal by multiplexing at least a parity check signal with an output signal of the transmit interface circuit to produce a multiplexed signal, a transmit parity check circuit for checking parity of the multiplexed signal, and a parity check signal output circuit responsive to the fault detection signal and an output signal of the transmit parity check circuit for, when the fault detection signal is representative of a fault, producing the parity check signal by inverting a logical state of the output signal of the transmit parity check circuit.

The receive terminal comprises a demultiplex conversion circuit for extracting from a received signal the parity check signal which is inserted at the transmit terminal, a receive parity check circuit for checking parity of the received signal, and a parity check signal comparison decision circuit for deciding whether or not an apparatus fault exists by comparing the parity check signal extracted by the demultiplex conversion circuit and an output signal of the receive parity check circuit.

BRIEF DESCRIPTION OF THE DRAWINGS

The above and other objects, features and advantages of the present invention will become more apparent from the following detailed description taken with the accompanying drawings in which.

DETAILED DESCRIPTION OF THE INVENTION

Figure 1A:
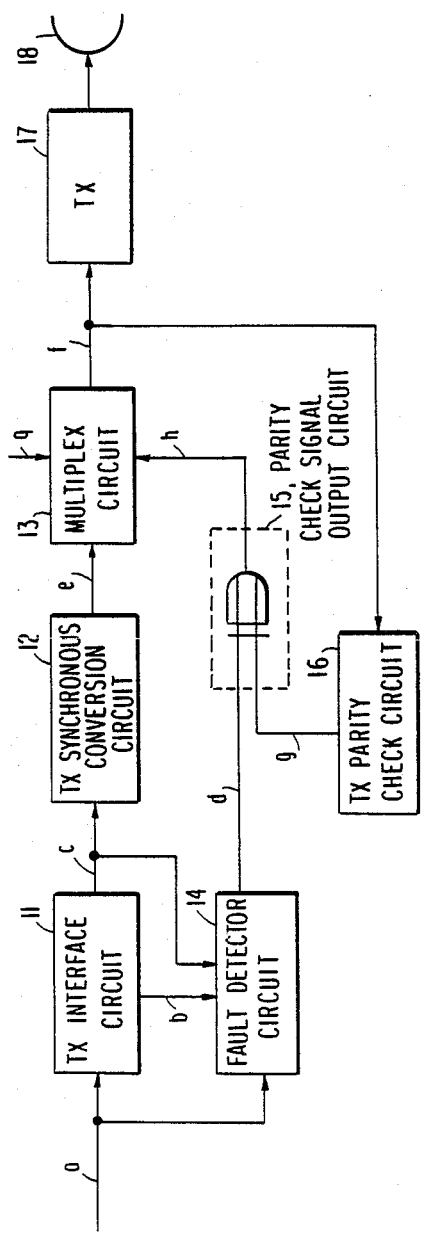
FIGS. 1A and 1B are schematic block diagrams showing, respectively, a transmit terminal and a receive terminal of a fault detection signal transmission system of the present invention.
Figure 1B:
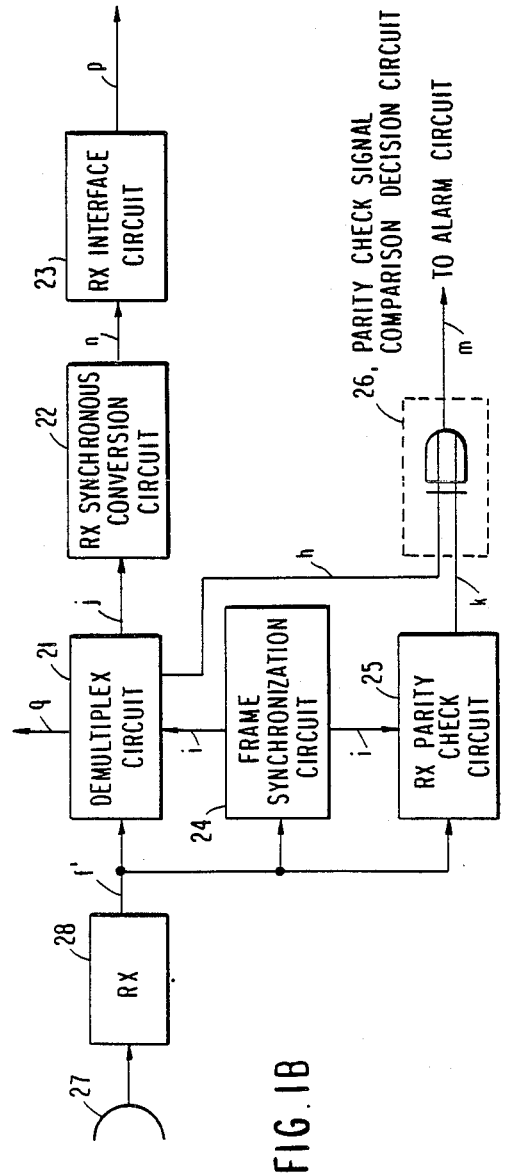

Referring to FIGS. 1A and 1B, there are shown, respectively, a transmit and a receive terminal of a fault detection signal transmission system of the present invention.

A transmit terminal shown in FIG. 1A comprises a transmit (TX) interface circuit 11, a TX synchronous conversion circuit 12, a multiplex circuit 13, a fault detector circuit 14, a parity check signal output circuit 15, a TX parity check circuit 16, a transmitter 17 and an antenna 18.

In the transmit terminal, an input signal or interface signal a from an exchange via a multiplexer (not shown) is applied to the TX interface circuit 11 as a signal which is to be transmitted. Having a self-diagnosis function, the TX interface circuit 11 applies its output signal b representative of the result of diagnosis to the fault detector circuit 14. Simultaneously, the TX interface circuit 11 converts the signal a (e.g. bipolar signal) into an NRZ (Non-Return to Zero) signal c which the TX synchronous conversion circuit 12 and multiplex conversion circuit 13 can process. Upon reception of the NRZ signal c, the TX synchronous conversion circuit 12 applies to the NRZ signal synchronous conversion which is necessary for the multiplex conversion circuit 13 to perform multiplexing. Specifically, the major role played by the circuit 12 is to form a time slot which is needed to multiplex a parity signal h and a supplementary signal (channel monitoring signal or order signal) q with the output signal c of the TX interface circuit 11. The synchronous conversion may be implemented with a pulse stuffing system, a rate conversion system and other various techniques which per se are well known in the art. The output signal e of the TX synchronous conversion circuit 12 is routed to the multiplex conversion circuit 13. In response, the circuit 13 inserts the parity check signal h, supplementary signal q and other various kinds of signals in predetermined time slots of the signal e, respectively, to thereby multiplex them while, at the same time, adding a frame synchronizing signal to the signal e. The resulting multiplexed signal f is fed to the transmitter 17 as well as to a TX transmit parity check circuit 16.

The TX parity check circuit 16 counts those bits of the multiplexed signal f in which the logical state is a ONE, during a predetermined time interval. Then, the circuit 16 produces a ONE if the number of those bits is even, for example, and a ZERO if it is odd, the output signal g of the circuit 16 being applied to one input terminal of a parity check signal output circuit 15. This circuit 15 may be implemented with an Exclusive-0R (EX-OR) gate by way of example. Applied to the other input terminal of the parity check signal output circuit 15 is a fault detection signal d which is output by the fault detector circuit 14. The fault detection signal d is a ONE when a fault is detected. Specifically, the signal d is set to, for example, a ONE when the output signal a from the exchange and the output signal c of the TX interface circuit 11 are absent or when the output signal b from the TX interface circuit 11 as a result of self-diagnosis is representative of the occurrence of a fault in the circuit 11.

Hence, when the fault detection signal d is a ONE due to the occurrence of a fault, the output signal h of the parity check signal output circuit 15 becomes a parity check signal produced by inverting the logical state of the output signal g of the TX parity check circuit 16. Specifically, while the signal d is a ONE, the signal h becomes a ONE if the signal g is a ZERO (even number) and a ZERO if it is a ONE (odd number).

The output signal f is applied to the transmitter 17 which includes a digital modulator (for example, PSK modulator, QAM modulator), a frequency converter and a power amplifier (not shown). The output of the transmitter 17 is sent to the receive terminal shown in FIG. 1B via the antenna 18.

The receive terminal of FIG. 1B comprises a demultiplex circuit 21, a receive (RX) synchronous conversion circuit 22, an RX interface circuit 23, a frame synchronization circuit 24, an RX parity check circuit 25, a parity check signal comparison decision circuit 26, an antenna 27 and a receiver 28.

In the receive terminal, the signal from the transmit terminal is picked up by the antenna 27 and fed to the receiver 28 including a amplifier, a frequency converter and a demodulator (not shown). The output signal f' of the receiver 28 is applied to the demultiplex conversion circuit 21, the frame synchronization circuit 24, and the RX parity check circuit 25. First, the demultiplex conversion circuit 21 separates from the multiplexed signal f' an output signal j as well as the parity check signal h, supplementary signal q and others which have been inserted at the transmit terminal, in response to a control signal i which is generated by the frame synchronization circuit 24. The parity check signal h, the output signal or received information signal j, and the supplementary signal q are routed to the parity check signal comparison decision circuit 26, the RX synchronous conversion circuit 22, and a supplementary signal interface circuit (not shown) respectively. The input signal j to the RX synchronous conversion circuit 22 is vacant at the locations which the various signals have occupied due to the operation of the demultiplexer conversion circuit 21, i.e., a signal having a so-called phase gap. The circuit 22, therefore, removes the phase gap from the signal j to apply a smoothed signal n to the RX interface circuit 23. In response, the RX interface circuit 23 produces an output signal p after applying various kinds of processing to the input signal n such as the conversion of the signal format to a one which is feasible for the following devices.

Upon reception of the multiplexed signal f', the frame synchronization circuit 24 establishes frame synchronization for allowing the receive terminal to detect the signal positions which are necessary for demultiplexing and, based on the result of frame synchronization, delivers the previously mentioned control signal i to the demultiplex conversion circuit 21 and RX parity check circuit 25. In response to the control signal i, the RX parity check circuit 25 performs parity check on the input multiplexed signal f' in the manner known in the art and delivers a signal k representative of the result of parity check to the parity check signal comparison decision circuit 26. So long as transmission bit errors are absent, the signal k is identical in content with the output signal g of the TX parity check circuit 16.

Implemented with an EX-OR gate, for example, the parity check signal comparison decision circuit 26 compares the parity check signal h from the demultiplex conversion circuit 21 and the above-mentioned parity check signal k with respect to their logical states. If the logical states of the signals h and k are opposite to each other, the circuit 26 turns its output signal m into, for example, a ONE indicating that a fault has occurred. If the two logical states are identical with each other, the circuit 26 turns its output signal m to, in this case, a ZERO indicating that no faults have occurred.

The output signal p from the RX interface circuit 23 is applied to an exchange via a demultiplexer (not shown).

In summary, paying attention to the parity checking function which is originally assigned to the above-described type of digital signal processing circuit, the present invention causes a transmit terminal to send the presence/absence of an apparatus fault to a receive terminal while relating it to the logical states of a parity check signal, thereby allowing the receive terminal to detect the fault as represented by a parity check error.

Specifically, at the transmit terminal, the TX synchronous conversion circuit 12 sends a fault detection signal by inverting the logical state of the parity check signal g, so that a particular time slot heretofore used to transmit a fault detection signal is needless. In addition, the multiplex conversion circuit 13 need not multiplex a fault detection signal as an independent signal. On the other hand, at the receive terminal, the demultiplex conversion circuit 21 does not have to perform the extraction of a fault detection signal particular to a prior art circuit. The RX synchronous conversion circuit 22, too, is freed from the operation of eliminating he phase gap of a particular time slot which would otherwise be assigned to a fault detection signal. Consequently, the amount of signal processing and, therefore, the circuit scale is reduced at both of the transmit and receive terminals.

Further, the particular time slot heretofore needed for a fault detection signal is usable for the transmission of data or the like to thereby enhance transmission efficiency as a whole.

What is claimed is:

1. A fault detection signal transmission system having a transmit terminal and receive terminal,
   said transmit terminal comprising:
   a transmit interface circuit for processing an input signal from a pre-stage circuit of said transmit interface circuit to produce an output signal that a post-stage circuit can process;
   a fault detector circuit for generating a fault detecting signal by detecting an apparatus fault based on at least an input state of said transmit interface circuit;
   a multiplex conversion circuit, forming said pre-stage circuit, for producing a multiplex signal by multiplexing at least a parity check signal with an output signal of said transmit interface circuit to produce a multiplexed signal;
   a transmit parity check circuit for checking parity of said multiplexed signal; and
   a parity check signal output circuit responsive to said fault detection signal and an output signal of said transmit parity check circuit for, when said fault detection signal is representative of a fault, producing said parity check signal by inverting a logical state of the output signal of said transmit parity check circuit;

said receive terminal comprising:

a demultiplex conversion circuit for extracting from a received signal said parity check signal which is inserted at said transmit terminal;

a receive parity check circuit for checking parity of said received signal; and a parity check signal comparison decision circuit for deciding whether or not an apparatus fault exists by comparing said parity check signal extracted by said demultiplex conversion circuit and an output signal of said receive parity check circuit.

2. A system as claimed in claim 1, wherein said parity check signal output circuit comprises an Exclusive-OR gate.

3. A system as claimed in claim 1, wherein said party check signal comparison decision circuit comprises an Exclusive-OR gate.

4. A fault detection signal transmission system as claimed in claim 1, wherein said pre-stage circuit comprises an exchange.

5. A fault detecting signal transmission system having a transmit terminal, said transmit terminal comprising:

a transmit interface circuit for processing an input signal from a pre-stage circuit of said transmit interface circuit to produce an output signal that a post-signal circuit can process;

a fault detector circuit for generating a fault detecting signal by detecting an apparatus fault based on at least an input state of said transmit interface circuit;

a multiplex conversion circuit, forming said pre-stage circuit, for producing a multiplex signal by multiplexing at least a parity check signal with an output signal of said transmit interface circuit to produce a multiplexed signal;

a transmit parity check circuit for checking parity of said multiplexed signal; and a parity check signal output circuit responsive to said fault detection signal and an output signal of said transmit parity check circuit for, when said fault detection signal is representative of a fault, producing said parity check signal by inverting a logical state of the output signal of said transmit parity check circuit.

6. A fault detection signal reception system responsive to a multiplex signal including a transmission signal and at least a parity check signal, said parity check signal having an inverted logical state to signify a fault in at least the interface circuit of a transmit terminal producing said multiplex signal, said reception system having a receive terminal comprising:

a demultiplex conversion circuit for extracting from said received multiplex signal said parity check signal which is inserted at said transmit terminal;

a receive parity check circuit for checking parity of said received multiplex signal; and a parity check signal output circuit responsive to said fault detection signal and an output signal of said transmit parity check circuit for producing said parity check signal by inverting a logical state of the output signal of said transmit parity check circuit, in response to a fault detection signal representative of a fault.

7. In a digital signal transmission system which includes a transmit terminal comprising an input interface circuit for receiving an input signal, a parity check circuit for producing a parity check signal for said input signal, a multiplex circuit for multiplexing at least the input signal and the parity check signal to produce a multiplexed signal, and transmitter means for transmitting the multiplexed signal, said transmit terminal further comprising:

a fault detector circuit for detecting a fault in said input interface circuit and/or producing a fault detection signal when a fault is detected; and a parity check signal output circuit responsive to said fault detection signal and an output signal of said parity check circuit for producing said parity check signal by inverting a logical state of the output signal of said parity check circuit, in response to a fault detection signal representative of a fault.

8. The digital signal transmission system as claimed in claim 7, further including means for applying the output of said parity check signal output circuit to said multiplex circuit for multiplexing with said input signal.

9. The digital signal transmission system as claimed in claim 8, further including a receive terminal comprising a demultiplex circuit for extracting the parity check signal multiplexed with the input signal at the transmit terminal, a parity check circuit for producing a parity signal based on the received multiplexed signal, and a parity check signal comparison circuit for comparing the extracted parity check signal with the parity check circuit produced parity signal.

10. The digital transmission system as claimed in claim 9, wherein said transmit terminal further includes a synchronous conversion circuit for synchronizing the input signal output from said input interface circuit, the output of said synchronous conversion circuit being applied to said transmit terminal multiplex circuit, and wherein said receive terminal further includes a frame synchronization circuit for producing a control signal output when frame synchronization has been established, said demultiplex circuit and said receive terminal parity check circuit being responsive to said control signal and the received multiplexer signal, a receive terminal synchronous conversion circuit responsive to the output from said demultiplex circuit, and a receive terminal interface circuit responsive to the input of said receive terminal conversion circuit.

11. A fault detection signal transmission system as claimed in claim 4, wherein said transmit interface circuit comprises a signal form conversion circuit for converting a bipolar input signal to a non-return to zero output signal.

12. A fault detecting signal transmission system having a transmit terminal, said transmit terminal comprising:

a transmit interface circuit for processing an input signal from a pre-stage circuit of said transmit interface circuit to produce an output signal that a post-stage circuit can process;

a fault detector circuit for generating a fault detecting signal by detecting an apparatus fault of said pre-stage circuit based on an input signal stage of said transmit interface circuit;

a multiplex conversion circuit, forming said pre-stage circuit, for producing a multiplex signal by multiplexing at least a parity check signal with an output signal of said transmit interface circuit to produce a multiplexed signal;

a transmit parity check circuit for checking parity of said multiplexed signal; and a parity check signal output circuit responsive to said fault detection signal and an output signal of said transmit parity check circuit for producing said parity check signal by inverting a logical state of the output signal of said transmit parity check circuit, when said fault detection signal is representative of a fault.

13. A fault detecting signal transmission system having a transmit terminal, said transmit terminal comprising:

a transmit interface circuit for processing an input signal from a pre-stage circuit of said transmit interface circuit to produce an output signal that a post-stage circuit can process;

a fault detector circuit for generating a fault detecting signal by detecting an apparatus fault of said transmit interface circuit;

a multiplex conversion circuit, forming said pre-stage circuit, for producing a multiplex signal by multiplexing at least a parity check signal with an output signal of said transmit interface circuit to produce a multiplexed signal;

a transmit parity check circuit for checking parity of said multiplexed signal; and a parity check signal output circuit responsive to said fault detection signal and an output signal of said transmit parity check circuit for producing said parity check signal by inverting a logical state of the output signal of said transmit parity check circuit, when said fault detection signal is representative of a fault.

* * * * *

UNITED STATES PATENT AND TRADEMARK OFFICE
CERTIFICATE OF CORRECTION

PATENT NO. : 4,876,686
DATED : October 24, 1989
INVENTOR(S) : Sasaki et al

It is certified that error appears in the above-identified patent and that said Letters Patent is hereby corrected as shown below:

Column 1, line 25, delete "o" and insert --to--.

Column 4, line 38, delete "he" and insert --the--.

Column 5, line 19, delete "party" and insert --parity--.

Signed and Sealed this

Twenty-sixth Day of March, 1991

Attest:

HARRY F. MANBECK, JR.

*Attesting Officer*     *Commissioner of Patents and Trademarks*